(12) United States Patent
Takijiri et al.

(10) Patent No.: US 9,640,800 B2
(45) Date of Patent: May 2, 2017

(54) NONAQUEOUS ELECTROLYTE SECONDARY BATTERY HAVING A POSITIVE ELECTRODE INCLUDING AN ALUMINUM FOIL AND A POSITIVE ELECTRODE ACTIVE MATERIAL LAYER FORMED THEREON

(75) Inventors: Manabu Takijiri, Hyogo (JP); Masanobu Takeuchi, Hyogo (JP); Yoshinori Kida, Hyogo (JP)

(73) Assignee: SANYO Electric Co., Ltd., Daito-shi, Osaka (JP)

( * ) Notice: Subject to any disclaimer, the term of this patent is extended or adjusted under 35 U.S.C. 154(b) by 443 days.

(21) Appl. No.: 14/002,262

(22) PCT Filed: Mar. 13, 2012

(86) PCT No.: PCT/JP2012/056405
§ 371 (c)(1),
(2), (4) Date: Aug. 29, 2013

(87) PCT Pub. No.: WO2012/124687
PCT Pub. Date: Sep. 20, 2012

(65) Prior Publication Data
US 2013/0337322 A1 Dec. 19, 2013

(30) Foreign Application Priority Data

Mar. 17, 2011 (JP) ................................. 2011-059023

(51) Int. Cl.
*H01M 4/66* (2006.01)
*H01M 4/13* (2010.01)
(Continued)

(52) U.S. Cl.
CPC .......... *H01M 4/661* (2013.01); *H01M 4/0404* (2013.01); *H01M 4/13* (2013.01);
(Continued)

(58) Field of Classification Search
CPC .......... H01M 4/66; H01M 4/13; H01M 4/139; H01M 4/0404; H01M 4/667; H01M 4/661;
(Continued)

(56) References Cited

U.S. PATENT DOCUMENTS

| | | | |
|---|---|---|---|
| 2002/0018926 A1* | 2/2002 | Shiga | H01M 4/13 429/61 |
| 2002/0086215 A1* | 7/2002 | Tamura | H01M 4/0461 429/245 |

(Continued)

FOREIGN PATENT DOCUMENTS

| | | |
|---|---|---|
| JP | 09-22699 A | 1/1997 |
| JP | 2000-164466 A | 6/2000 |

(Continued)

OTHER PUBLICATIONS

JP 2004014247MT.*

(Continued)

*Primary Examiner* — Alex Usyatinsky
(74) *Attorney, Agent, or Firm* — Westerman, Hattori, Daniels & Adrian, LLP

(57) ABSTRACT

Provided is a nonaqueous electrolyte secondary battery with improved high-rate discharge characteristics. The nonaqueous electrolyte secondary battery includes a positive electrode including a metal foil and a positive electrode active material layer formed thereon; a negative electrode containing a negative electrode active material; and a nonaqueous electrolyte containing a nonaqueous solvent and a solute dissolved therein. The metal foil of the positive electrode is an aluminum foil having an at least partially roughened surface adjacent to the positive electrode active material layer. The positive electrode includes a conductive layer containing a conductor and a binder in recesses in the at least partially roughened surface of the aluminum foil. The posi- (Continued)

tive electrode active material layer is disposed on the conductive layer and contains a positive electrode active material, the conductor, and the binder.

6 Claims, 1 Drawing Sheet

(51) Int. Cl.
 *H01M 4/139* (2010.01)
 *H01M 4/04* (2006.01)
 *H01M 10/052* (2010.01)
(52) U.S. Cl.
 CPC .......... *H01M 4/139* (2013.01); *H01M 4/667* (2013.01); *H01M 10/052* (2013.01); *Y02E 60/122* (2013.01); *Y02P 70/54* (2015.11); *Y02T 10/7011* (2013.01)
(58) Field of Classification Search
 CPC H01M 10/052; Y02E 60/122; Y02T 10/7011; Y02P 70/54
 See application file for complete search history.

(56) References Cited

U.S. PATENT DOCUMENTS

| | | | |
|---|---|---|---|
| 2005/0095504 A1* | 5/2005 | Kim | H01M 2/1673 429/246 |
| 2008/0096109 A1* | 4/2008 | Fukumine et al. | 429/212 |
| 2008/0233477 A1* | 9/2008 | Takahashi et al. | 429/212 |
| 2009/0246631 A1* | 10/2009 | Hojo et al. | 429/213 |

FOREIGN PATENT DOCUMENTS

| | | |
|---|---|---|
| JP | 2000-269095 A | 9/2000 |
| JP | 2000-294251 A | 10/2000 |
| JP | 2003-059493 A | 2/2003 |
| JP | 2004-014247 A | 1/2004 |
| JP | 2004-288520 A | 10/2004 |
| JP | 2005-142156 A | 6/2005 |
| JP | 2005-251554 A | 9/2005 |
| JP | 2006-179367 A | 7/2006 |
| JP | 2007-317583 A | 12/2007 |
| JP | 2010-033768 A | 2/2010 |

OTHER PUBLICATIONS

JP2010-033768Mt.*
Partial Translation for JP PA 2013-522517.*
International Search Report dated Jun. 19, 2012, issued in corresponding application No. PCT/JP2012/056405.
Office Action dated Mar. 15, 2016, issued in counterpart Japanese Patent Application No. 2013-522517 (3 pages).

* cited by examiner

NONAQUEOUS ELECTROLYTE SECONDARY BATTERY HAVING A POSITIVE ELECTRODE INCLUDING AN ALUMINUM FOIL AND A POSITIVE ELECTRODE ACTIVE MATERIAL LAYER FORMED THEREON

TECHNICAL FIELD

The present invention relates to nonaqueous electrolyte secondary batteries with improved high-rate discharge characteristics and methods for manufacturing such nonaqueous electrolyte secondary batteries.

BACKGROUND ART

Nonaqueous electrolyte secondary batteries are compact, lightweight, high-energy-density batteries with a wide range of applications including power supplies for mobile devices. Recently, these batteries have also attracted attention as power supplies for powering devices such as power tools, electric vehicles, and HEVs. Such power supplies require high-rate discharge characteristics, i.e., the ability to discharge a large current in a relatively short period of time.

PTL 1 discloses that the use of an aluminum foil having a roughened surface facing a positive electrode layer improves the adhesion between the active material layer and the aluminum foil. However, there is a need for a further modification to improve the high-rate discharge characteristics of nonaqueous electrolyte secondary batteries.

PTL 2 discloses that it is advantageous to form a carbon intermediate film on an aluminum foil current collector and form an active material layer thereon to reduce the electrical resistance between the current collector and the active material. Again, in this citation, there is a need for a further modification to improve the high-rate discharge characteristics of nonaqueous electrolyte secondary batteries. This method also has a problem that it requires the steps of forming the carbon intermediate film and forming the active material layer thereon, which complicate the manufacturing process.

CITATION LIST

Patent Literature

PTL 1: Japanese Published Unexamined Patent Application No. 9-22699
PTL 2: Japanese Published Unexamined Patent Application No. 2000-164466

SUMMARY OF INVENTION

Technical Problem

An object of the present invention is to provide a nonaqueous electrolyte secondary battery with improved high-rate discharge characteristics that includes a positive electrode containing a positive electrode active material, a negative electrode containing a negative electrode active material, and a nonaqueous electrolyte containing a nonaqueous solvent and a solute dissolved therein.

Solution to Problem

To achieve the foregoing object, the present invention provides a nonaqueous electrolyte secondary battery including a positive electrode including a metal foil and a positive electrode active material layer formed thereon; a negative electrode containing a negative electrode active material; and a nonaqueous electrolyte containing a nonaqueous solvent and a solute dissolved therein. The metal foil of the positive electrode is an aluminum foil having an at least partially roughened surface adjacent to the positive electrode active material layer. The positive electrode includes a conductive layer containing a conductor and a binder in recesses in the at least partially roughened surface of the aluminum foil. The positive electrode active material layer is disposed on the conductive layer and contains a positive electrode active material, the conductor, and the binder.

As used herein, the term "aluminum foil having a roughened surface" refers to an aluminum foil having a surface in which projections and recesses are formed by a method for surface roughening of a metal foil.

Examples of methods for surface roughening of a metal foil that are used in the present invention include plating, vapor deposition, etching, and polishing. Examples of plating processes include electrolytic plating and electroless plating. Examples of vapor deposition processes include sputtering, CVD, and evaporation. Examples of polishing processes include sandpaper polishing and blasting.

Preferably, the average roughening interval $R_{sm}$ of the roughened surface of the aluminum foil determined by a method specified as the mean width of profile elements in JIS B0601-2001 is 0.05 to 3.0 µm. If the average roughening interval $R_{sm}$ is less than 0.05 µm, bubbles build up in the recesses of the roughened aluminum foil and thus make it difficult for conductor particles to enter the recesses.

If the average roughening interval $R_{sm}$ is more than 3.0 µm, a portion of the active material might fill the recesses in the roughened surface and thus prevent the conductive layer from being formed in the recesses. Such a positive electrode might not function efficiently to provide the advantages of the present invention.

The positive electrode as described above has high adhesion between the active material layer and the aluminum foil and also forms a good conduction path. It is therefore possible to prevent a collapse of the conduction path between the aluminum foil and the active material layer due to an abrupt change in the volume of the active material during high-rate discharge or due to swelling of the binder with an abrupt rise in battery temperature. It is also possible to reduce an increase in resistance due to decreased adhesion between the active material layer and the aluminum foil. Thus, the high-rate discharge characteristics of this type of nonaqueous electrolyte secondary battery are improved.

The nonaqueous electrolyte secondary battery satisfies the relationship $R_{AM} > R_{sm} > R_{G1}$, where $R_{sm}$ is the average roughening interval of the roughened surface of the aluminum foil, $R_{AM}$ is the particle size ($D_{10}$) of the positive electrode active material, and $R_{G1}$ is the particle size ($D_{50}$) of the conductor, where $D_{10}$, $D_{50}$, and $D_{90}$ are the particle sizes at cumulative 10%, 50%, and 90%, respectively, from smaller sizes in a volume-based cumulative particle size distribution determined by laser diffraction or electron microscopy.

If this relationship is satisfied, the conductor and the binder enter the recesses of the aluminum foil and spontaneously form a conductive layer when a positive electrode slurry is applied thereto. In addition, because the positive electrode active material layer can be simultaneously formed on the conductive layer, they have a continuous binding structure. In addition, because the conductive layer and the positive electrode active material layer can be simultaneously formed by one coating step, the manufacturing process can be simplified.

Another method for fabricating the electrode is by forming a conductive layer containing a conductor smaller than the average roughening interval $R_{sm}$ on the roughened surface of the aluminum foil and then depositing the positive electrode active material layer thereon. In this case, however, the active material layer and the conductive layer have no continuous binding structure and thus have low adhesion and increased resistance at the interface therebetween. This method also has a problem in that it complicates the manufacturing process. Thus, the former method is preferred.

The particle sizes of the active material and the binder are preferably measured by laser diffraction, whereas the particle size of a carbon conductor is preferably measured by electron microscopy. The average roughening interval $R_{sm}$ of the surface of the aluminum foil can be determined by the method specified as the mean width of profile elements in JIS B0601-2001. Specifically, the average roughening interval $R_{sm}$ can be measured using an instrument such as a laser microscope or a surface roughness meter.

The binder is preferably soluble in a solvent. If the binder is a dispersion of emulsion particles, the binder preferably has a particle size smaller than the roughening interval $R_{sm}$.

The positive electrode of the nonaqueous electrolyte secondary battery of the present invention does not necessarily contain only one conductor; it preferably contains two or more conductors with different particle sizes. In this case, the nonaqueous electrolyte secondary battery preferably satisfies the relationship $R_{AM}>R_{G2}>R_{sm}>R_{G1}$, where $R_{G1}$ is the particle size ($D_{50}$) of a conductor G1 having the smallest particle size, and $R_{G2}$ is the particle size ($D_{50}$) of a conductor G2 having a larger particle size than the conductor G1.

If this relationship is satisfied, the conductor G1 having a smaller particle size than the average roughening interval $R_{sm}$ fills the recesses of the roughened aluminum foil, whereas the conductor G2 having a larger particle size than the average roughening interval $R_{sm}$ is present in the positive electrode active material layer. Thus, the high-rate discharge characteristics of the nonaqueous electrolyte secondary battery are further improved.

The use of two or more conductors with different particle sizes also requires a smaller amount of binder, which is advantageous in terms of the high-rate discharge characteristics of the nonaqueous electrolyte secondary battery. If a conductor with a smaller particle size is used alone, more binder is adsorbed onto the surface of the conductor without contributing to the adhesion of the electrode because of the larger specific surface area of the conductor. More binder is therefore required to ensure sufficient adhesion. The binder, however, is generally not conductive and decreases the conductivity of the electrode.

For the above reason, two or more conductors with different particle sizes may be used to reduce the specific surface area of the conductor, which affects the amount of binder. In addition, the roughened surface of the aluminum foil ensures sufficient adhesion between the active material layer and the aluminum foil and therefore requires a smaller amount of binder. Thus, the high-rate discharge characteristics are further improved.

The volume ratio of the conductor G2 having a larger particle size than the average roughening interval $R_{sm}$ to the conductor G1 having a smaller particle size than the average roughening interval $R_{sm}$ is preferably 1:1 to 0.25:1. If the volume ratio exceeds 1:1, the conductive layer formed on the aluminum foil cannot ensure sufficient conductivity because of the excessive ratio of the larger particles, which fill the gap between the active material particles. If the volume ratio falls below 0.25:1, the advantage of requiring a smaller amount of binder as described above is not expected because of the insufficient ratio of the larger particles.

The volume ratio of the conductor having a smaller particle size than the average roughening interval $R_{sm}$ to the binder is preferably 1:0.5 to 1:1. If the ratio of the binder to the conductor having a smaller particle size than the average roughening interval $R_{sm}$ is excessive, the battery temperature rises during high-rate discharge because of the decreased conductivity of the conductive layer, which fills the recesses of the roughened aluminum foil. If the ratio of the binder is low, it is difficult to provide a sufficient effect because of the decreased adhesion between the aluminum foil and the conductive layer.

[Other Considerations]

(1) The conductor used in the present invention may be any material that can form a conduction path in the electrode, such as a carbon material or a metal powder. Carbon materials are preferred in terms of cost. Examples of carbon materials include furnace black, acetylene black, Ketjen Black, graphite, and mixtures thereof.

(2) The positive electrode active material may be, for example, a lithium-containing transition metal composite oxide containing transition metals such as cobalt, nickel, and manganese. Examples of such positive electrode active materials include lithium cobalt oxide, lithium Ni—Co—Mn composite oxide, lithium Ni—Mn—Al composite oxide, and lithium Ni—Co—Al composite oxide. Also available are lithium manganese composite oxide, which has a spinel structure, and lithium iron phosphate, which has an olivine structure. These positive electrode active materials may be used alone or as a mixture.

(3) The negative electrode active material may be any material used as a negative electrode active material for nonaqueous electrolyte secondary batteries. Examples of negative electrode active materials include carbon materials such as graphite and coke; tin oxide; metallic lithium; metals, such as silicon, that can be alloyed with lithium; and alloys thereof. Carbon materials are preferred in terms of cost, including natural graphite, artificial graphite, mesophase pitch-based carbon fiber, mesocarbon microbeads, coke, hard carbon, fullerene, and carbon nanotubes.

To further improve the high-rate discharge characteristics, a carbon material prepared by coating a graphite material with low-crystallinity carbon is preferably used as the negative electrode active material. The nonaqueous electrolyte may be any nonaqueous electrolyte that can be used for nonaqueous electrolyte secondary batteries. Typically, the nonaqueous electrolyte is a nonaqueous electrolyte containing a support salt and a solvent.

Examples of support salts include $LiBF_4$, $LiPF_6$, $LiN(SO_2CF_3)_2$, $LiN(SO_2C_2F_5)_2$, and $LiPF_{6-x}(C_nF_{2n+1})_x$ (where $1<x<6$ and $n=1$ or $2$). These support salts may be used alone or as a mixture of two or more. The concentration of the support salt is preferably, but not limited to, 0.8 to 2.0 mol/L.

Examples of preferred solvents include carbonate solvents such as ethylene carbonate, propylene carbonate, γ-butyrolactone, diethylene carbonate, ethylmethyl carbonate, and dimethyl carbonate and those in which some of the hydrogen atoms are substituted with F. It is particularly desirable to use a mixed solvent of a cyclic carbonate and a linear carbonate. The volume ratio of the cyclic carbonate to the linear carbonate in the mixed solvent is preferably 2:8 to 5:5.

Advantageous Effects of Invention

The present invention can provide a nonaqueous electrolyte secondary battery with improved high-rate discharge characteristics that includes a positive electrode containing a positive electrode active material, a negative electrode containing a negative electrode active material, and a nonaqueous electrolyte containing a nonaqueous solvent and a solute dissolved therein.

DESCRIPTION OF EMBODIMENTS

The present invention will be described in greater detail with reference to the following embodiments, although the present invention is not limited to the embodiments below, but various modifications are possible without changing the spirit thereof.

Example 1

Fabrication of Positive Electrode

A slurry was prepared by mixing 94.5 parts by mass of lithium nickel cobalt manganese composite oxide having a particle size ($D_{10}$) of 9 μm as a positive electrode active material, 2.5 parts by mass of a carbon conductor G1 having a particle size ($D_{50}$) of 0.05 μm as a conductor, 1 part by mass of a carbon conductor G2 having a particle size ($D_{50}$) of 6.0 μm as a conductor, and 2 parts by mass of polyvinylidene fluoride as a binder, and adding an appropriate amount of N-methyl-2-pyrrolidone. This slurry was applied to an aluminum foil having an average roughening interval $R_{sm}$ of 1.9 μm and was dried. The aluminum foil was then cut into a predetermined electrode size, was rolled with a roller, and was equipped with a positive electrode lead for use as a positive electrode.

Figure 2:
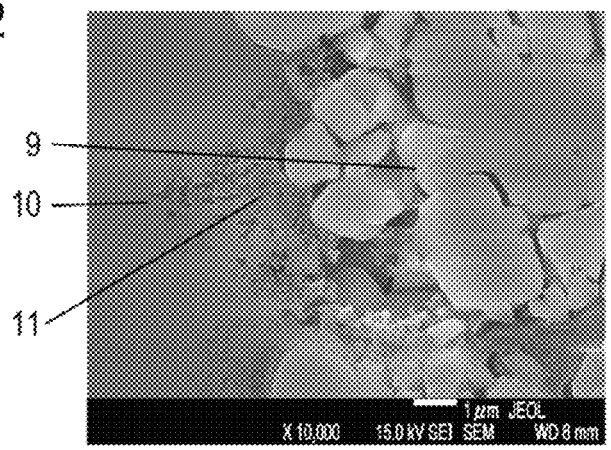
FIG. 2 is an SEM showing a cross-section of a positive electrode used for the battery of the present invention.

FIG. 2 shows a cross-sectional SEM of the thus-fabricated electrode. This micrograph shows that the conductors and the binder formed a conductive layer 11 in the recesses of the roughened aluminum foil 10.

The average roughening interval $R_{sm}$ of the aluminum foil was measured using a confocal laser microscope.

Figure 3:
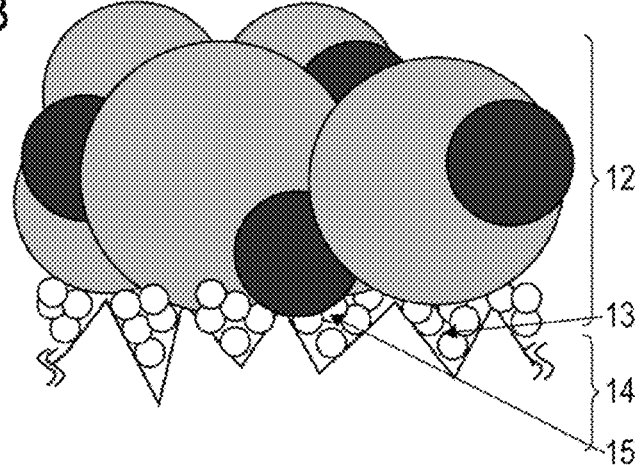
FIG. 3 is a diagram schematically showing the cross-sectional structure of an electrode according to the present invention.

FIG. 3 schematically shows the cross-sectional structure of an electrode according to the present invention. An aluminum foil 14 having a roughened surface has projections and recesses in the surface thereof. A conductive layer 13 containing a carbon conductor G1 and a binder is formed in the recesses, and an active material layer 12 is formed thereon. The average distance between the tips of the adjacent projections in the roughened surface of the aluminum foil 14 is close to $R_{sm}$.

<Fabrication of Negative Electrode>

A slurry was prepared by mixing 97.5 parts by mass of artificial graphite as a negative electrode active material, 1 part by mass of carboxymethylcellulose as a thickener, and 1.5 parts by mass of styrene butadiene rubber as a binder, and adding an appropriate amount of pure water. This slurry was applied to a copper foil and was dried. The copper foil was then cut into a predetermined electrode size, was rolled with a roller, and was equipped with a negative electrode lead for use as a negative electrode.

<Preparation of Nonaqueous Electrolyte>

A nonaqueous electrolyte was prepared by dissolving $LiPF_6$, which is a lithium salt, to a concentration of 1.5 mol/L in a mixed solvent of ethylene carbonate (EC) and dimethyl carbonate (DMC) in a volume ratio of 25:75.

<Fabrication of Battery>

The positive electrode and the negative electrode were placed opposite each other with a polyethylene microporous film separator therebetween and were wound around a core into a spiral shape. The core was then removed to obtain a spiral electrode assembly. The electrode assembly was inserted into a metal can. The metal can was filled with the nonaqueous electrolyte and was sealed to obtain a 18650 nonaqueous electrolyte secondary battery A1 having a battery size of 18 mm in diameter and 65 mm in height.

Figure 1:
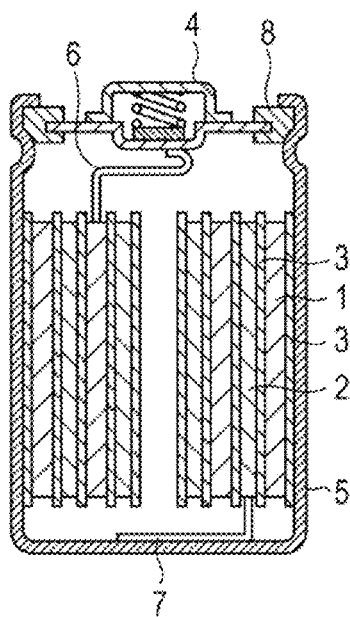
FIG. 1 is a diagram schematically showing the cross-sectional structure of a battery according to the present invention.

FIG. 1 is a schematic sectional view of the thus-fabricated nonaqueous electrolyte secondary battery. Reference sign 1 denotes a positive electrode, 2 denotes a negative electrode, 3 denotes a separator, 4 denotes a cap serving as a positive electrode terminal, 5 denotes a negative electrode can, 6 denotes a positive electrode current collector, 7 denotes a negative electrode current collector, and 8 denotes an insulating gasket.

Comparative Example 1

A nonaqueous electrolyte secondary battery X1 of a comparative example was fabricated as in Example 1 except that an aluminum foil having an unroughened surface was used.

Comparative Example 2

A nonaqueous electrolyte secondary battery X2 of a comparative example was fabricated as in Example 1 except that an aluminum foil having a carbon-coated unroughened surface was used.

(Test Conditions)

The resistances of the thus-fabricated nonaqueous electrolyte secondary batteries A1, X1, and X2 were measured by the AC method at 1 kHz. The nonaqueous electrolyte secondary batteries A1, X1, and X2 were then charged at a constant current of 0.2 It to 4.2 V and were charged at a constant voltage of 4.2 V to 0.05 It. The nonaqueous electrolyte secondary batteries A1, X1, and X2 were then discharged at 20 A to a discharge end voltage of 2.5 V. Thereafter, the resistances of the nonaqueous electrolyte secondary batteries A1, X1, and X2 were measured by the AC method at 1 kHz. The rate of increase in resistance after discharge at 20 A was calculated by the following equation. The results are shown in Table 1 below.

Rate of increase in resistance at 1 kHz (%)=1.0−(resistance at 1 kHz after discharge at 20 A/resistance at 1 kHz before discharge at 20 A)×100.

TABLE 1

| Battery | Aluminum foil | Rate of increase in resistance at 1 kHz after discharge at 20 A |
|---|---|---|
| Battery A1 | Roughened surface | 2.9% |

TABLE 1-continued

| Battery | Aluminum foil | Rate of increase in resistance at 1 kHz after discharge at 20 A |
|---|---|---|
| Battery X1 | Untreated surface | 23.3% |
| Battery X2 | Carbon-coated surface | 11.1% |

The results in Table 1 demonstrate that the battery A1 of Example 1, in which an aluminum foil having a roughened surface was used, had a smaller increase in resistance after discharge at 20 A than the battery X1 of Comparative Example 1, in which an aluminum foil having an unroughened surface was used, and the battery X2 of Comparative Example 2, in which an aluminum foil having a carbon-coated surface was used, indicating that the high-rate discharge characteristics were improved.

INDUSTRIAL APPLICABILITY

The present invention is expected to be particularly applicable to high-power applications requiring high-rate discharge, including power supplies for EVs and HEVs and power supplies for power tools.

REFERENCE SIGNS LIST

1 positive electrode
2 negative electrode
3 separator
9 positive electrode active material
10 aluminum foil having roughened surface
11 conductive layer
12 active material layer
13 conductive layer
14 aluminum foil having roughened surface
15 carbon conductor having smaller particle size

The invention claimed is:

1. A nonaqueous electrolyte secondary battery comprising:
a positive electrode including an aluminum foil and a positive electrode active material layer formed thereon;
a negative electrode containing a negative electrode active material; and
a nonaqueous electrolyte containing a nonaqueous solvent and a solute dissolved therein, wherein
the aluminum foil of the positive electrode having an at least partially roughened surface adjacent to the positive electrode active material layer,
the positive electrode including a conductive layer containing a conductor and a binder in recesses in the at least partially roughened surface of the aluminum foil, and
the positive electrode active material layer being disposed on the conductive layer and containing a positive electrode active material, the conductor, and the binder,
wherein the conductor contained in the positive electrode comprises at least two conductors with different particle sizes, and
wherein the nonaqueous electrolyte secondary battery satisfies the relationship $R_{AM} > R_{G2} > Rsm > R_{G1}$,
where $R_{G1}$ is a particle size ($D_{50}$) of a conductor G1 having a smaller particle size,
$R_{G2}$ is a particle size ($D_{50}$) of a conductor G2 having a larger particle size than the conductor G1,
$R_{AM}$ is a particle size ($D_{10}$) of the positive electrode active material, and
Rsm is an average roughening interval of a roughened surface of the aluminum foil determined by a method specified as a mean width of profile elements in JIS B0601-2001.

2. The nonaqueous electrolyte secondary battery according to claim 1, wherein
an average roughening interval $R_{sm}$ of the roughened surface of the aluminum foil determined by a method specified as a mean width of profile elements in JIS B0601-2001 is 0.05 to 3.0 μm.

3. The nonaqueous electrolyte secondary battery according to claim 1, wherein the volume ratio of the conductor G2 having a larger particle size than the average roughening interval Rsm to the conductor G1 having a smaller particle size than the average roughening interval Rsm is 1:1 to 0.25:1.

4. The nonaqueous electrolyte secondary battery according to claim 3, wherein the volume ratio of the conductor having a smaller particle size than the average roughening interval Rsm to the binder is 1:0.5 to 1:1.

5. The nonaqueous electrolyte secondary battery according to claim 1, wherein the conductor is a carbon material or a metal powder.

6. The nonaqueous electrolyte secondary battery according to claim 5, wherein the conductor is a carbon material.

* * * * *